(12) United States Patent  
Kay (10) Patent No.: US 7,539,905 B2  
(45) Date of Patent: May 26, 2009

(54) METHOD OF AND APPARATUS FOR DETECTING AN ERROR IN WRITING TO PERSISTENT MEMORY

(75) Inventor: Andrew Kay, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 497 days.

(21) Appl. No.: 10/528,328

(22) PCT Filed: Sep. 16, 2003

(86) PCT No.: PCT/JP03/11789

§ 371 (c)(1),  
(2), (4) Date: Sep. 15, 2005

(87) PCT Pub. No.: WO2004/027615

PCT Pub. Date: Apr. 1, 2004

(65) Prior Publication Data

US 2006/0143541 A1   Jun. 29, 2006

(30) Foreign Application Priority Data

Sep. 20, 2002 (GB) ................................ 0221868.3

(51) Int. Cl.  
*G01R 31/28* (2006.01)

(52) U.S. Cl. ............................ 714/42; 714/718; 714/25

(58) Field of Classification Search ................... None  
See application file for complete search history.

(56) References Cited

U.S. PATENT DOCUMENTS 5,369,757 A * 11/1994 Spiro et al. .................... 714/19  
5,469,562 A * 11/1995 Saether ......................... 714/20  
5,530,806 A *  6/1996 Condon et al. ................. 714/49

(Continued)

FOREIGN PATENT DOCUMENTS

EP            0 398 545 A      11/1990

(Continued)

OTHER PUBLICATIONS

IEEE 100 The Authoritative Dictionary of IEEE Standards Terms, Seventh Edition, Dec. 2000, The Institute of Electrical and Electronics Engineering, Inc., Published by: Standards Information Network IEEE Press, p. 626.*

(Continued)

*Primary Examiner*—Cynthia Britt  
*Assistant Examiner*—Steven D Radosevich  
(74) *Attorney, Agent, or Firm*—Renner, Otto, Boisselle & Sklar, LLP (57) ABSTRACT

A technique is provided for detecting errors in persistent memory, such as flash memory, where values of data items are stored at memory locations added consecutively to one end of the already-allocated memory segment. When a new location is added, a pointer to the address of the new location is stored at the location of a preceding value for that item. The address of the latest location is determined (21) whenever power is reapplied. The pointer fields of the locations are searched (24) for any pointer whose value is greater than the address of the last location. If such a pointer value is found, this indicates that an error occurred when writing the pointer value, for example because power was removed before completion of the pointer writing cycle. The error can be corrected by changing the pointer value to the address of the last location (27).

30 Claims, 4 Drawing Sheets

U.S. PATENT DOCUMENTS

| | | | |
|---|---|---|---|
| 5,873,097 A * | 2/1999 | Harris et al. | 707/203 |
| 6,412,080 B1 | 6/2002 | Fleming et al. | |
| 6,622,205 B1 * | 9/2003 | Weiss | 711/110 |
| 6,779,084 B2 * | 8/2004 | Wolrich et al. | 711/118 |
| 7,131,115 B2 * | 10/2006 | Hundt et al. | 717/130 |
| 7,337,275 B2 * | 2/2008 | Wolrich et al. | 711/132 |
| 2001/0007108 A1 * | 7/2001 | Teich et al. | 707/200 |
| 2002/0027508 A1 * | 3/2002 | Baba | 340/693.2 |
| 2002/0054602 A1 * | 5/2002 | Takahashi et al. | 370/412 |
| 2002/0128994 A1 * | 9/2002 | Sadhasivan et al. | 707/1 |

FOREIGN PATENT DOCUMENTS

| | | |
|---|---|---|
| EP | 0 834 882 A | 4/1998 |
| EP | 1 241 677 A | 9/2002 |

OTHER PUBLICATIONS

International Search Report for corresponding Application No. PCT/JP2003/011789, mailed Apr. 27, 2004.

* cited by examiner

*All figures in HEX*

METHOD OF AND APPARATUS FOR DETECTING AN ERROR IN WRITING TO PERSISTENT MEMORY

TECHNICAL FIELD

The present invention relates to a method of and an apparatus for detecting an error in writing to persistent memory. The invention also relates to a method of and an apparatus for correcting the result of such an error. Such techniques may be used in embedded systems and examples of suitable applications include: smart cards such as Java Cards; digital active storage or security devices such as smart keys and smart disks; SIMs and USIMs for mobile telephones; data logging devices; small devices which record user preferences, store settings or log usage; computer systems in vehicles; set-top boxes; and internet routers. Such techniques are useful for persistent or "non-volatile" memories of the "write-once-erase-in-bulk" type, such as flash memory, and of the "write-only" type.

BACKGROUND ART

The term "Persistent Data Item" or "PDI" as used herein is defined to be a data item having associated with it a value which changes over time, in particular when updated by an application program, and which is required to retain its state between such updates, particularly when the application is not running and when power is removed intentionally, when the application is switched off, or accidentally, for example because of a power failure or removal from a power source.

Computer programs operate by reading and updating the values of variables. For variables in RAM, this presents little difficulty as the values can be rewritten as often as necessary and reading and writing are fast. When the program is not running, its state must be stored in more persistent memory.

On small computer platforms such as smart cards, there is little RAM and the persistent memory often takes the form of EEPROM or Flash memory. This memory has the property that, once a bit has been changed, it cannot be changed again until the whole segment is erased. In EEPROM, the segment size may be as small as a single byte (8 bits) and the memory can be treated essentially as very slow RAM. In flash memory, the segments are generally large (e.g. 64 KB) for silicon area efficiency and the erase operation is slow. Also, the memory will eventually wear out after some number of erase cycles (say 100,000 for high quality Flash). The advantage of flash memory is that it is faster and much more can be packed into a given chip area so there is more storage space, but it is harder than EEPROM to use efficiently.

Consider a smart card application which keeps a record of the date and time (obtained from a card reader terminal, perhaps) on each occasion that it runs and checks the interval between runs. This could be used for a security function, such as enforcing a daily withdrawal limit for a cash card. Every time it runs, it must read the old date, check it and store the new date. The date is therefore a PDI. If the date were stored in the same location each time it changes, the whole 64K block would first have to be erased because of the physical memory limitations and this would take a long time and rapidly wear out the flash memory.

Instead, each time the new date is written, it must be stored in a new area of memory. It is assumed that this program has to share the flash memory with other programs, so it is not efficient to pre-allocate a large block of flash memory just for this one application. In other words, there may be many PDIs in the system and they might be updated at different rates, depending on the applications running.

Figure 1:
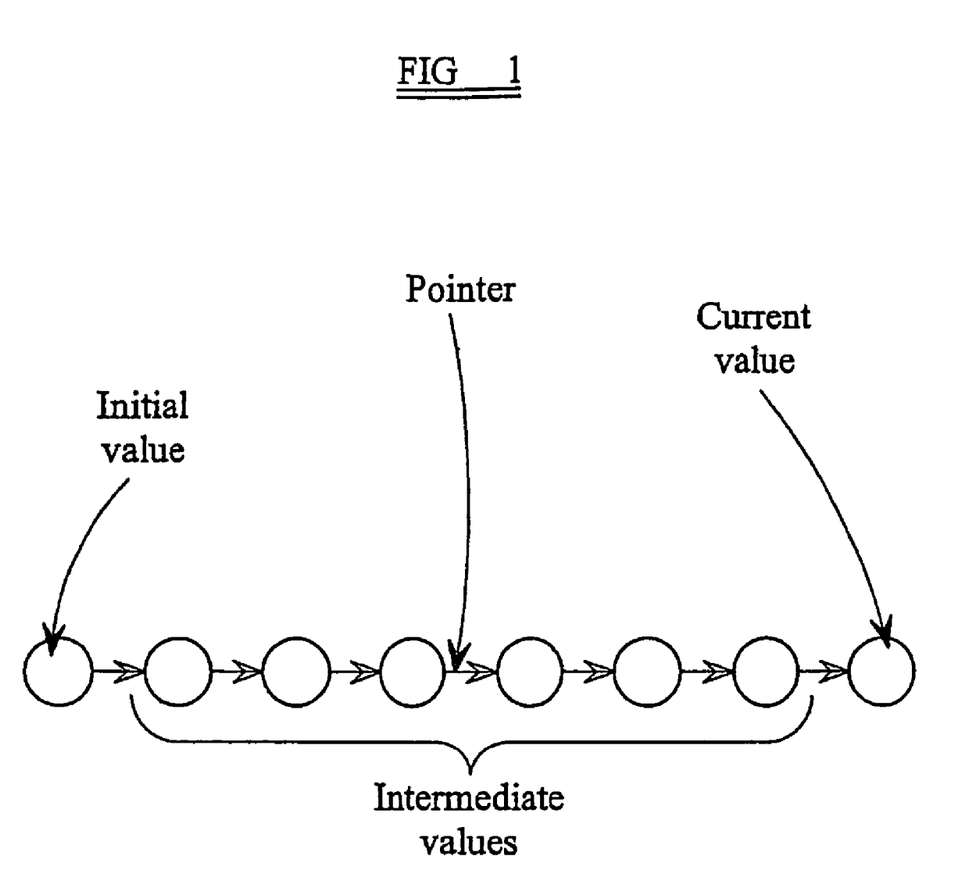
FIG. 1 is a diagram illustrating a known linked chain of PDI values.

A known arrangement for storing PDIs builds a linked chain of values for each PDI as illustrated in FIG. 1 of the accompanying drawings. The first element of the chain is at a known address. For the specific application mentioned above, each element of the chain stores a value for the date record and has a space for a pointer to the next item in the chain. The last chain element will have a pointer value equal to the erased memory pattern (FFFF in hexadecimal in this model where the erased state of each bit is 1 or 0000 in the complementary model where the erased state of each bit is 0). To read the current date, reading starts at the beginning of the chain and follows pointers until one is reached with value FFFF. To add a new date, a new chain element is created with the new value and an empty pointer. The address is then stored over the pointer part of the previous last-element.

When the block is full, only the most recent values for each PDI need to be copied to a fresh block, after which the old block is erased. This is referred to as "garbage collection". When garbage collecting, the last value in the chain is copied to the new block and used as the start of the new chain.

If power is removed from a flash memory during a write cycle, there is a danger that the operation will be incomplete and that an inconsistent state will be available when power is reapplied. In the case of a contactless smart card having flash memory, the card itself does not have any power supply but relies on receiving power from a card reader when presented thereto. If the card is removed from the reader during a write operation to the flash memory, the power supply may be interrupted during the write cycle so that the data actually stored are different from the data which were intended to be stored.

For example, in a typical flash memory, the erased state of each bit is 1 and each bit can be changed to 0 during a write cycle but the reverse change from 0 to 1 can only be achieved by erasing a whole page or segment at a time. Also, if a write cycle is interrupted, each bit which is to be changed from 1 to 0 will either change to 0 or remain at 1. Typically, a whole word comprising 16 bits is written in parallel to the flash memory. When a write operation is interrupted by power loss, some or all of the requested changes from 1 to 0 may have occurred but it is impossible to identify which changes have occurred and which (if any) have not. When power is applied again, the smart card cannot tell whether the stored data has been corrupted because of power loss during a write cycle.

In the case of the linked chain as illustrated in FIG. 1 of the accompany drawings and as described hereinbefore or in the case of the arrangement disclosed in British patent application no. 0205573.9 (the contents of which are incorporated herein by reference), which describes an improved arrangement, the current value of each data item is the last one in the linked chain or list. If power fails when the pointer to the last value is being written into the flash memory, it may not be possible to retrieve the last value when power is restored. Any application relying on such a last value will therefore not function correctly or may not function at all.

DISCLOSURE OF THE INVENTION

According to a first aspect of the invention, there is provided a method of detecting an error in a persistent memory segment in which values of at least one data item are stored in temporally consecutively allocated memory locations, each new memory location is added to a first end of a block of the memory segment having first and second ends, and a pointer to each new memory location is added to an old memory location in the block containing a preceding value of the at least one data item, the method comprising the steps of:
(a) Determining the address to which the last-added pointer points;
(b) Comparing the determined address with an address range of the memory block including the last new memory location; and
(c) Performing an action if the determined address is outside the address range.

The steps (a) to (c) may be performed each time power is supplied to the memory segment.

The step (a) may comprise determining the addresses to which all of the pointers point and selecting the highest or lowest address.

The step (c) may comprise changing the address of the last-added pointer to the address of the last new memory location.

Each new memory location may be added contiguously to the first end of the block.

Each pointer may point to a highest or lowest address of the memory location to which it points.

The memory segment may comprise at least part of a flash memory.

Each memory location may have space for a single value of the at least one data item.

Each bit of the memory segment may be individually switchable only from 1 to 0 and the action may be performed when the detected address is greater than the highest address of the address range. As an alternative, each bit of the memory segment may be individually switchable only from 0 to 1 and the action may be performed when the detected address is less than the lowest address of the address range.

The memory segment may contain at least one write counter in which a respective flag is set at the end of each value storing operation and a respective further flag is set at the end of each pointer adding operation, and the steps (a) to (c) may be performed only if an odd number of flags and further flags is set. The at least one write counter may comprise a data item.

The memory segment may contain at least one write counter in which, when storing a series of one or more data item values, a respective flag is set before the first pointer adding operation in the series and a respective further flag is set after the final pointer adding operation in the series, and the steps (a) to (c) may be performed only if an odd number of flags and further flags is set.

According to a second aspect of the invention, there is provided a program for controlling a computer to perform a method according to the first aspect of the invention.

According to a third aspect of the invention, there is provided a computer programmed by a program according to the second aspect of the invention.

According to a fourth aspect of the invention, there is provided a storage medium containing a program according to the second aspect of the invention.

According to a fifth aspect of the invention, there is provided an apparatus comprising a persistent memory segment, a portion which stores values of at least one data item in temporally consecutively allocated memory locations with each new memory location being added to a first end of a block of the memory segment having first and second ends, a portion which adds a pointer pointing to each new memory location to an old memory location in the block containing a preceding value of the at least one data item, a portion which determines the address to which the last-added pointer points, a portion which compares the determined address with an address range of the memory block including the last new memory location, and a portion which performs an action if the determined address is outside the address range.

The determining portion, the comparing portion and the performing portion may be arranged to be actuated each time power is supplied to the apparatus.

The determining portion may be arranged to determine the addresses to which all of the pointers point and to select the highest or lowest address.

The performing portion may be arranged to change the address of the last-added pointer to the address of the last new memory location.

Each new memory location may be added contiguously to the first end of the block.

Each pointer may point to a highest or lowest address of the memory location to which it points.

The memory segment may comprise at least part of a flash memory.

Each memory location may have space for a single value of the at least one data item.

Each bit of the memory segment may be individually switchable only from 1 to 0 and the performing portion may be arranged to perform the action when the detected address is greater than the highest address of the address range. As an alternative, each bit of the memory segment may be individually switchable only from 0 to 1 and the performing portion may be arranged to perform the action when the detected address is less than the lowest address of the address range.

The apparatus may comprise: a portion which sets, in at least one write counter in the memory segment, a respective flag at the start of each storing operation and a respective further flag at the end of each pointer adding operation: and a portion which assesses whether the number of set flags and further flags is odd, the determining portion, the comparing portion and the performing portion being arranged to be actuable in response to the assessing portion. The at least one write counter may comprise a data item.

The apparatus may comprise: a portion which sets, in at least one write counter in the memory segment and when storing a series of one or more data item values, a respective flag before the first pointer adding operation in the series and a respective further flag after the final pointer adding operation in the series; and a portion which assesses whether the number of set flags and further flags is odd, the determining portion, the comparing portion and the performing portion being arranged to be actuable in response to the assessing portion.

The apparatus may comprise a smart card.

It is thus possible to provide an arrangement which allows errors in pointers of linked chains of PDIs and similar structures to be detected reliably. This technique also allows such errors to be corrected. Thus, for example, any application relying on PDIs stored in flash memory or the like is prevented from inadvertently using incorrect data read from the memory.

BRIEF DESCRIPTION OF THE DRAWINGS

The invention will be further described, by way of example, with reference to the accompanying drawings, in which.

BEST MODE FOR CARRYING OUT THE INVENTION

Figure 2:
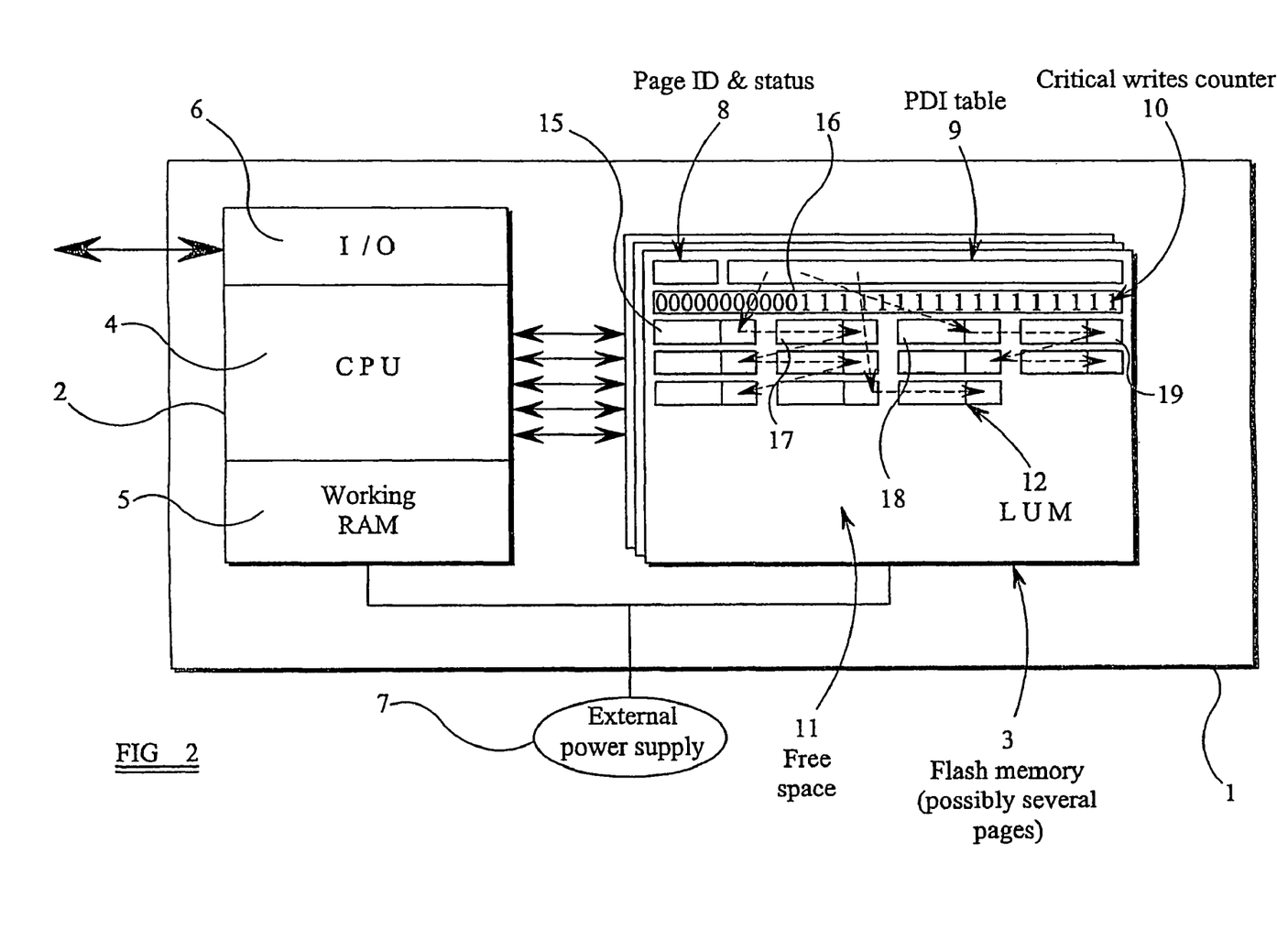
FIG. 2 is a diagram illustrating an apparatus constituting an embodiment of the invention.

FIG. 2 illustrates a smart card of the "contactless" type for cooperating with a card reader to transfer data. The card 1 has embedded in it a computer 2 and a flash memory 3 shown as comprising several pages or segments. The computer 2 comprises a central processor unit (CPU) 4 provided with a working random access memory (RAM) 5 and an input/output interface (I/O) 6 for contactless communication with a card reader. The card 1 does not have an internal power supply but instead relies on an external power supply 7 provided within the card reader (not shown). The computer 2 and the memory 3 are thus only powered when the card 1 is correctly inserted in a card reader.

The flash memory segment illustrated in FIG. 2 is configured to act as a non-volatile memory for persistent data items (PDIs). Thus, whereas data which does not need to be stored in the absence of power uses the working RAM 5 which is volatile, PDIs whose values must be preserved in the absence of power are stored in the flash memory segment.

The flash memory segment illustrated in FIG. 2 is configured to store a page identifier and status 8, for example indicating whether the page is in use or has been erased and is ready for future use, a PDI table 9 containing a pointer for each PDI pointing to the location or "node" containing the first value of the PDI stored in the segment, a critical writes counter 10, and nodes to which values of the PDIs have already been written. The segment has free space as illustrated at 11 and what is currently the last used memory word (LUM) to have been allocated is indicated at 12.

When the card 1 is initially configured, the computer 2 enters the page identifier and status 8 and reserves space in the memory 3 for the PDI table 9 and the critical writes counter 10. When the first value of the first PDI is written to the memory 3, space sufficient for the value of the item and for a pointer to a next value is allocated at the start of the memory segment at node 15. A pointer associated with the first PDI is inserted in the table 9 and points to the last word of the node 15 as illustrated by the arrow 16.

The flash memory 3 is of the type in which, when the segment is erased, all of its bits are set to 1. Thus, all of the bits of the counter 10 are initially set to 1. Also, the bits of the word at the node 15 reserved for the pointer to the next value of the PDI are all set to 1 and await overwriting when the next value arrives.

In the example illustrated in FIG. 2, the next value to be stored in the memory 3 is a second value of the first PDI. At the start of the write cycle, a new node 17 is allocated for storing the second PDI value. For example, the final word of the node, which will subsequently contain a pointer to anode for a later value of the PDI, has its least significant bit set to 0. Because all pointers are to even-numbered addresses, there is no conflict with the subsequent writing of a pointer in this word. Enough memory space is provided between the word for the pointer and the previous node 15 to contain the second data value of the first PDI. The node may be allocated such that it is contiguous with the node 15, for example so as to maximise the use of memory space, or a gap may be left, for example to ensure that its pointer is at an even address when the second data value is oddly sized. However, control of writing to the memory segment is such that nodes are always added to the end of the space containing previously allocated nodes and are never inserted between existing nodes.

In the next step of the write cycle, the second data value of the first PDI is stored in the part of the node 17 available for data storage. The first bit of the counter 10 is set to 0 to indicate the successful completion of the data writing operation. A pointer to the address of the last word of the node 17 assigned to a subsequent pointer is then written in the pointer field of the word 15. The second bit of the counter 10 is then set to zero to indicate the completion of the write cycle.

The next value which is to be stored in the memory segment of the flash memory 3 is the first value of a second PDI. At the start of the write cycle, the next available node 18 is allocated, after which the value is written into the data value field of the node 18. A pointer to the last word of the node 18 (i.e. that of highest address) which will subsequently contain a pointer is stored at the second location in the PDI table 9.

The fourth value to be stored in the memory 3 is the second value of the second PDI. As described hereinbefore, the next available node 19 is allocated by setting the least significant bit of its last or highest address word to 0, the data value is written in the value field of the node 19, the third bit of the counter 10 is set to 0, a pointer to the last word of the node 19 is written into the pointer field (the last or highest address word) of the node 18, and the fourth bit of the counter 10 is set to zero.

This process is repeated each time a new value of any of the PDIs arrives for writing into the segment of the memory 3. In particular, each new value is written into a node which follows (and may be contiguous with) the node containing the previously received value for storage. A next bit of the counter 10 is set to zero after writing the value into the new node and another bit of the counter is set to zero when the pointer to the new word has been written into the pointer field of the node containing the preceding value of the same PDI.

In the case where the technique disclosed in British Patent Application No. 0205573.9 is being used, the pointer may not be written into the node containing the immediately preceding value of the same PDI but may instead be written into a "far field" of a node containing an earlier value of the same PDI. This patent application also describes a technique where the value field of each node is capable of storing several values of its PDI. Thus, a new node is allocated for that PDI only when all of the value fields have been filled. When such a technique is used, it is unnecessary, for values after the first one which are written to the node, for a fresh pointer to be written in a preceding node. Also, it is unnecessary for the critical writes counter 10 to be updated. Thus, the procedure described hereinbefore is only used when the value field of the node has been filled and it is necessary to allocate a new node for that PDI. Such an arrangement may be used for storing the counter 10 and may provide more efficient use of memory space.

In practice and as mentioned above, when a new node is allocated for a new PDI value, enough bytes are allocated to store the value and the next pointer and this is done by setting a bit in what is now the new LUM. If each pointer within the memory segment uses two bytes and words are always stored at even addresses, then the lowest bit in the pointer field of the new node may be set to zero. This provides an indication of the highest address within the memory segment which has been allocated at any time, because all bits at addresses above that of the LUM will be in their reset 1 state.

When the computer 2 needs to find the current value of any of the PDIs, it follows the path defined by the pointers stored in the temporally consecutively allocated nodes for the PDI. Thus, the computer 2 identifies the pointer in the PDI table 9 to the node containing the first value and checks whether the pointer in that node points to a valid address. If so, the computer checks the node to which the pointer is pointing. When the computer detects that a stored pointer represents an allocated node but does not contain a pointer, the value stored at that node is known to be the current value of the PDI and is used by the computer.

If the power supply is removed from the card 1 while a pointer is being written in the appropriate word field of the memory segment, the value of the pointer which is stored may be incorrect. Because writing to the memory 3 involves switching bits from 1 to 0, an incomplete write cycle results in the binary value of the stored bit pattern for the pointer being larger than the intended value because it has more 1's than it should have. This allows a pointer write error to be detected and corrected.

Figure 4:
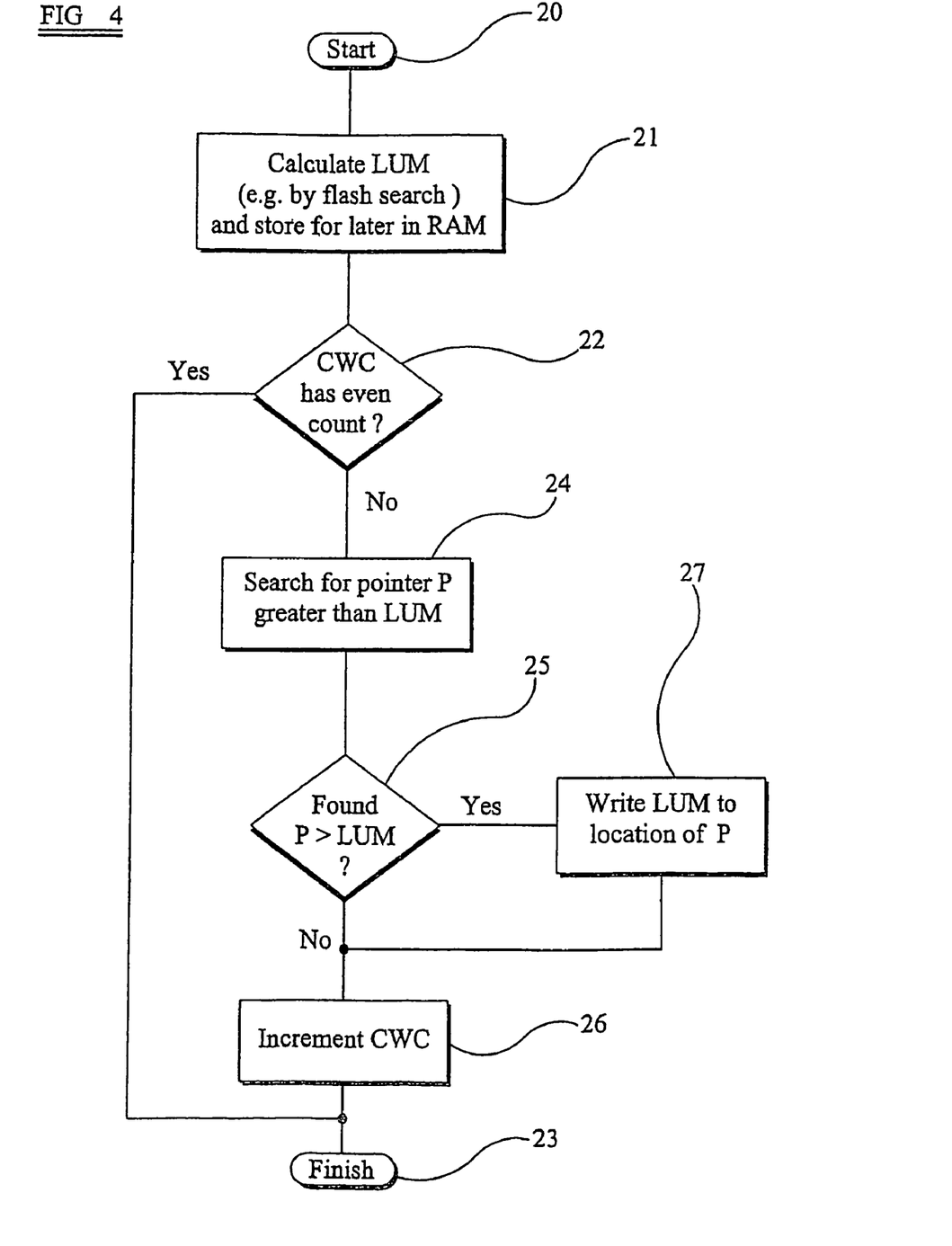
FIG. 4 is a flow diagram illustrating the method.

FIG. 4 illustrates a method which is performed each time power is applied to the card 1. The method or routine is started at 20 and, at 21, the computer 2 searches the memory segment for the current LUM 12. For example, the computer 2 starts from the highest address in the memory segment and works towards the lowest address checking each word in turn until one is found where not all of the bits are 1. The address of this word is then the address of the LUM. The computer 2 then stores the address of the LUM in the RAM 5.

At a step 22, the computer 4 checks whether the critical writes counter 10 contains an even number of set bits. Whenever a new PDI value is written into the flash memory segment successfully, two bits of the counter 10 are set to 0. Conversely, whenever a write operation has begun but is not completed before power is removed from the card 1, only 1 bit is set to 0 so that the counter 10 contains an odd number of set bits. Accordingly, it is possible to detect whether a possible writing error occurred by counting the number of zeros in the counter 10.

If the counter 10 contains an even number of zeros, no further intervention is necessary and the routine shown in FIG. 4 finishes at 23. If the count is odd, then the computer 2 searches, in a step 24, for a pointer in the words stored in the memory segment having a value which is greater than the address of the LUM previously stored in the RAM 5 in the step 21. Any pointer having the value FFFF or FFFE is ignored because, although it is pointing to an address greater than that of the current LUM, it represents a pointer which is not yet pointing to an allocated node. Otherwise, any incorrect pointer must have an address which is greater than the address of the current LUM. Also, the correct value for any such pointer is the address of the LUM.

In a step 25, the computer 2 determines whether an incorrect pointer was found. If not, a step 26 sets the next bit of the counter 10 to zero and the routine finishes at 23. If an erroneous pointer value is found, a step 27 corrects the pointer value to the address of the LUM so as to correct the pointer value. The step 26 is then performed before finishing at 23 so that the counter 10 contains an even number of 0's indicating that there is no longer any error.

Figure 3:
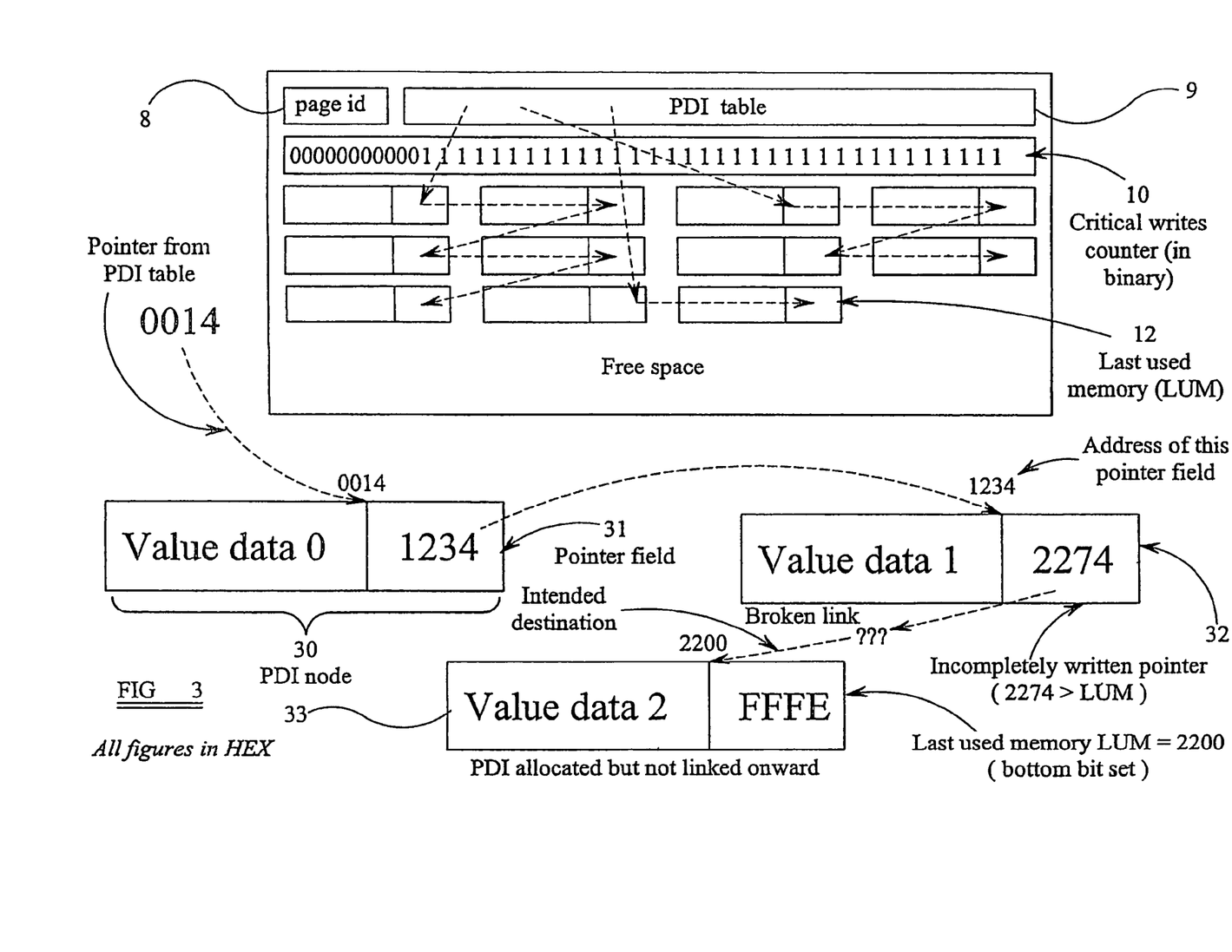
FIG. 3 is a diagram illustrating operation of the apparatus of FIG. 2 in accordance with a method constituting an embodiment of the invention.

FIG. 3 illustrates a specific example where an error has occurred, is detected and subsequently corrected. The first value (value data 0) of a PDI is stored at a PDI node 30 whose last word or pointer field is at address 0014. A pointer to the last word of the node 30 is stored in the PDI table 9. When the next value (value data 1) of the PDI arrives, the computer 2 finds the pointer for the PDI in the table 9 and checks the pointer field 31 to discover that the node 30 contains the immediately preceding value of the PDI. The next value is written into the value field of the node 32 and the address 1234 is entered in the pointer field 31 at the node 30 (all pointers are expressed in hexadecimal). The counter 10 is updated as described hereinbefore.

When the next value (value data 2) of the same PDI is to be stored, the computer 2 follows the trail of pointers and determines that the node 32 contains the immediately preceding value. The next available space for a node in the memory segment is located and a node is allocated with its pointer field at address 2200. Allocation of the node is performed by changing the lowest bit of the address 2200 to 0, thus leaving FFFE in the pointer field. The value data 2 are stored in the value field of the node 33 and the next non-zero bit of the counter 10 is set to zero. A pointer to the node 33 begins to be written into the pointer field of the node 32 but power is removed, for example by withdrawing the card 1 from the card reader, before this is completed so that an incompletely written pointer 2274 is present in the pointer field of the word 32. In particular, the binary value 0010001000000000 should have been written into the pointer field of the node 32 but, instead, the binary value 0010001001110100 was written because switching of the third, fifth, sixth and seventh bits from 1 to 0 was not performed before power was removed.

When power is next applied to the card 1, the routine shown in FIG. 4 is performed. This determines that the address field of the node 33 is stored at the LUM and that the address of the pointer stored in the pointer field of the node 32 has a value higher than the address 2200 of the LUM. Writing of the correct pointer in the pointer field of the node 32 is therefore completed by switching the appropriate bits in this field to represent the correct address 2200.

It is thus possible to detect and correct incorrectly written pointers. The only additional space required within the segment of the flash memory 3 is that for the critical writes counter 10. The counter 10 requires relatively little space in the segment or may be stored in a different segment. Thus, pointer errors can be detected and corrected with minimal penalty in terms of reduced storage space in the memory.

In one embodiment as described above, a memory segment contains a critical write counter in which a flag is set at the end of each value storing operation and a further flag is set at the end of each pointer adding operation. This ensures that, during a critical write to update the pointer address, the critical write counter is indicating an odd value. However, it is also possible that, where there is a set of updates to make to one or more PDIs, a flag may be set in the critical write counter before the first pointer adding operation in the set of updates and a further flag set only after the final pointer adding operation in the set of updates. If power fails between the setting of the flag and the setting of the further flag, a search will occur at the next power up. The advantage with this approach is that the critical write counter is written only twice during the set, thus making the system faster at least in the case where the power does not fail.

In an alternative embodiment, the critical writes counter lo can be omitted. In this case, the computer 2 cannot tell, when power is reapplied, whether any pointer errors may have occurred and must therefore compare all of the stored pointer values with the address of the LUM. If a pointer value is higher than the address of the LUM, the error is detected and can be corrected as described hereinbefore. Thus, in this modified technique, there is no penalty in terms of reduced memory capacity but more time is required by the computer 2 to search for any errors.

In the case of a flash memory 3 having more than one segment for storing PDIs, the same technique may be used for each segment. In particular, each segment has its own LUM and is used to store a subset of the PDIs.

It is also possible to split the critical writes counter 10 in to several parts by partitioning the space of PDIs with each counter relating to a respective partition. For example, where there are several pages of memory, a respective counter may be provided for each active page. Also, each page may be partitioned with a separate critical writes counter for each partition. Searching and correcting an error in each partition is quicker but more memory space is required by several critical writes counters and each counter must be checked when power is applied to determine whether an error is present in the respective partition.

The critical writes counter may also be treated as a PDI by allocating it in segments. The last item in the update chain is then the active block of the counter. This allows a smaller amount of memory to be initially allocated to the counter and, if the segment subsequently fills with a small number of large PDIs, then little space is wasted.

The critical writes counter may be stored in the segment to which it relates or may be stored in a different segment. In the former case, it is important to ensure that new critical write counter segments are not allocated in the middle of another critical update. Otherwise, the LUM which the other update is using will have changed. To avoid this, the new critical write counter segment may be allocated a few updates earlier than required and not when a critical update is being performed.

This technique may also be applied to flash memories of the type which are reset such that all of their bits are at 0 and writing to the memory involves changing the value of a bit from 0 to 1. For example, all pointers may be stored in inverse or complementary form and may be reinverted when being read. Alternatively, when using such a memory, the first value to be stored may be allocated to the node of highest address with subsequent values being allocated to and stored at the next lower address. The word of lowest address at each node is used as the pointer field. In this case, if a pointer value is incorrectly written, it will point to an address which is lower than that of the LUM. Thus, an erroneous pointer can be detected and its value corrected.

These techniques may also be combined, for example by using a flash memory of the type where bits are written from 1 to 0, allocating memory from higher to lower addresses and storing pointers in their inverse or complementary form.

INDUSTRIAL APPLICABILITY

The present invention relates to a method of and an apparatus for detecting an error in writing to persistent memory. The invention also relates to a method of and an apparatus for correcting the result of such an error. Such techniques may be used in embedded systems and examples of suitable applications include: smart cards such as Java Cards; digital active storage or security devices such as smart keys and smart disks; SIMs and USIMs for mobile telephones; data logging devices; small devices which record user preferences, store settings or log usage; computer systems in vehicles; set-top boxes; and internet routers. Such techniques are useful for persistent or "non-volatile" memories of the "write-once-erase-in-bulk" type, such as flash memory, and of the "write-only" type.

The invention claimed is:

1. A method of detecting an error in a persistent memory segment in which values of at least one data item are stored in temporally consecutively allocated memory locations, each new memory location is added to a first end of a block of the memory segment having first and second ends, and a pointer to each new memory location is added to an old memory location in the block containing a preceding value of the at least one data item, an address range of the memory block being the range of addresses of all allocated memory locations including a last new memory location (LUM), the method comprising:

(a) determining the address to which the last-added pointer points;
(b) comparing the determined address with an address range of the memory block including the last new memory location (LUM); and
(c) correcting the address to which the last-added pointer points if the determined address is outside the address range.

2. A method as claimed in claim 1, wherein the steps (a) to (c) are performed each time power is applied to the memory segment.

3. A method as claimed in claim 1, wherein the step (a) comprises determining the addresses to which all of the pointers point and selecting the highest or lowest address.

4. A method as claimed in claim 1, wherein the step (c) comprises changing the address of the last-added pointer to the address of the last new memory location.

5. A method as claimed in claim 1, wherein each new memory location is added contiguously to the first end of the block.

6. A method as claimed in claim 1, wherein each pointer points to a highest or lowest address of the memory location to which it points.

7. A method as claimed in claim 1, wherein the memory segment comprises at least part of a flash memory.

8. A method as claimed in claim 1, wherein each memory location has space for a single value of the at least one data item.

9. A method as claimed claim 1, wherein each bit of the memory segment is individually switchable only from 1 to 0 and the action is performed when the detected address is greater than the highest address of the address range.

10. A method as claimed in claim 1, wherein each bit of the memory segment is individually switchable only from 0 to 1 and the action is performed when the detected address is less than the lowest address of the address range.

11. A method as claimed in claim 1, wherein the memory segment contains at least one write counter in which a respective flag is set at the end of each value storing operation and a respective further flag is set at the end of each pointer adding operation, and also characterised in that the steps (a) to (c) are performed only if an odd number of flags and further flags is set.

12. A method as claimed in claim 11, wherein the at least one write counter comprises a data item.

13. A method as claimed in claim 1, wherein the memory segment contains at least one write counter in which, when storing a series of one or more data item values, a respective flag is set before the first pointer adding operation in the series and a respective further flag is set after the final pointer adding operation in the series, and also wherein that the steps (a) to (c) are performed only if an odd number of flags and further flags is set.

14. A program stored on a computer-readable medium for controlling a computer to perform a method as claimed in claim 1.

15. A computer programmed by a program stored on a computer-readable medium as claimed in claim 14.

16. An apparatus comprising a persistent memory segment, a portion which stores values of at least one data item in temporally consecutively allocated memory locations with each new memory location being added to a first end of a block of the memory segment having first and second ends, a portion which adds a pointer pointing to each new memory location to an old memory location in the block containing a preceding value of the at least one data item, and wherein by a portion which determines the address to which the last-added pointer points, a portion which compares the determined address with an address range of the memory block including a last new memory location (LUM), and a portion which corrects the address to which the last-added pointer points if the determined address is outside the address range, wherein the address range of the memory block is the range of addresses of all allocated memory locations including the new memory location (LUM).

17. An apparatus as claimed in claim 16, wherein the determining portion, the comparing portion and the performing portion are arranged to be actuated each time power is applied to the apparatus.

18. An apparatus as claimed in claim 16, wherein the determining portion is arranged to determine the addresses to which all of the pointers point and to select the highest or lowest address.

19. An apparatus as claimed in claim 16, wherein the correcting portion is arranged to change the address of the last-added pointer to the address of the last new memory location.

20. An apparatus as claimed in claim 16, wherein each new memory location is added contiguously to the first end of the block.

21. An apparatus as claimed in claim 16, wherein each pointer points to a highest or lowest address of the memory location to which it points.

22. An apparatus as claimed in claim 16, wherein the memory segment comprises at least part of a flash memory.

23. An apparatus as claimed in claim 16, wherein each memory location has space for a single value of the at least one data item.

24. An apparatus as claimed in claim 16, wherein each bit of the memory segment is individually switchable only from 1 or 0 and the performing portion is arranged to perform the action when the detected address is greater than the highest address of the address range.

25. An apparatus as claimed in claim 16, wherein each bit of the memory segment is individually switchable only from 0 to 1 and the performing portion is arranged to perform the action when the detected address is less than the lowest address of the address range.

26. An apparatus as claimed in claim 16, comprising: a portion which sets, in at least one write counter in the memory segment, a respective flag at the start of each value storing operation and a respective further flag at the end of each pointer adding operation; and a portion which assesses whether the number of set flags and further flags is odd, the determining portion, the comparing portion and the performing portion being arranged to be actuable in response to the assessing portion.

27. An apparatus as claimed in claim 26, wherein the at least one write counter comprises a data item.

28. An apparatus as claimed in claim 16, comprising: a portion which sets, in at least one write counter in the memory segment and when storing a series of one or more data item values, a respective flag before the first pointer adding operation in the series and a respective further flag after the final pointer adding operation in the series; and a portion which assesses whether the number of set flags and further flags is odd, the determining portion, the comparing portion and the performing portion being arranged to be actuable in response to the assessing portion.

29. An apparatus as claimed in claim 16, comprising a smart card.

30. An apparatus comprising a flash memory segment, means for storing values of at least one data item in temporally consecutively allocated memory locations with each new memory location being added to a first end of a block of the memory segment having first and second ends, means for adding a pointer pointing to each new memory location to an old memory location in the block containing a preceding value of the at least one data item, means for determining the address to which the last-added pointer points, means for comparing the determined address with an address range of the memory block including the last new memory location, and means for correcting the address to which the last-added point points if the determined address is outside the address range, wherein the address range of the memory block is the range of addresses of all allocated memory locations including the last new memory location (LUM).

* * * * *